US008980800B2

(12) United States Patent
Beall et al.

(10) Patent No.: US 8,980,800 B2
(45) Date of Patent: Mar. 17, 2015

(54) METHODS FOR REDUCING FLUID LOSS OF A VISCOELASTIC SURFACTANT GEL INTO A SUBTERRANEAN FORMATION

(75) Inventors: Brian B. Beall, Spring, TX (US); Richard S. Wheeler, Crosby, TX (US); D V Satyanarayana Gupta, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 848 days.

(21) Appl. No.: 12/329,727

(22) Filed: Dec. 8, 2008

(65) Prior Publication Data

US 2010/0144560 A1    Jun. 10, 2010

(51) Int. Cl.
C09K 8/68 (2006.01)
C09K 8/12 (2006.01)
C09K 8/76 (2006.01)

(52) U.S. Cl.
CPC ... *C09K 8/68* (2013.01); *C09K 8/12* (2013.01); *C09K 8/76* (2013.01); *C09K 2208/30* (2013.01)
USPC .............................. 507/244; 507/219; 507/240

(58) Field of Classification Search
None
See application file for complete search history.

(56) References Cited

U.S. PATENT DOCUMENTS

| | | | |
|---|---|---|---|
| 3,898,167 A | 8/1975 | Crowe | |
| 4,507,440 A * | 3/1985 | Engelhardt et al. | 525/218 |
| 4,518,745 A * | 5/1985 | Engelhardt et al. | 525/326.6 |
| 4,938,803 A * | 7/1990 | Huddleston et al. | 106/719 |
| 5,465,792 A | 11/1995 | Dawson et al. | |
| 5,735,349 A | 4/1998 | Dawson et al. | |
| 6,169,058 B1 | 1/2001 | Le et al. | |
| 6,228,812 B1 * | 5/2001 | Dawson et al. | 507/221 |
| 6,401,489 B1 | 6/2002 | Cheng | |
| 6,468,945 B1 | 10/2002 | Zhang | |
| 6,491,099 B1 | 12/2002 | Di Lullo Arias et al. | |
| 6,730,637 B1 | 5/2004 | Stewart et al. | |
| 6,767,869 B2 | 7/2004 | DiLullo et al. | |
| 7,303,018 B2 | 12/2007 | Cawiezel et al. | |
| 7,326,670 B2 | 2/2008 | DiLullo et al. | |
| 7,413,013 B2 | 8/2008 | Welton et al. | |
| 7,439,209 B2 | 10/2008 | Chesser et al. | |
| 2002/0076803 A1 * | 6/2002 | Crews | 435/266 |
| 2006/0234871 A1 * | 10/2006 | Dalrymple et al. | 507/211 |
| 2006/0266522 A1 * | 11/2006 | Eoff et al. | 166/278 |
| 2008/0070805 A1 * | 3/2008 | Munoz et al. | 507/110 |

* cited by examiner

*Primary Examiner* — John J Figueroa
(74) *Attorney, Agent, or Firm* — John Wilson Jones; Jones & Smith, LLP (57) ABSTRACT

Methods and compositions of treating formations using viscoelastic treatment fluids are provided that reduce the amount of fluid loss to the formations due to the lack of polymer backbone in the viscoelastic treatment fluids. The methods and compositions of treating formations include a fluid loss additive that includes a copolymer that includes a hydrophilic monomeric unit and a first anchoring monomeric unit.

20 Claims, 5 Drawing Sheets

FIGURE 5
Fluid Loss Test
10 mD Berea Core / 1000 psi / 80°F

# METHODS FOR REDUCING FLUID LOSS OF A VISCOELASTIC SURFACTANT GEL INTO A SUBTERRANEAN FORMATION

BACKGROUND OF THE INVENTION

1. Field of the Invention

The invention relates to methods and compositions for reducing fluid loss in viscoelastic treatment fluids that are essentially free of polymers.

2. Description of the Related Art

Treatment fluids are used in a variety of subterranean treatments. Such treatments include drilling operations, stimulation treatments, sand control treatments, and the like. Treatment fluids are generally viscosified to enable the treatment fluids to perform such tasks as transporting solids in drilling operations and transporting particulates, such as proppant, in fracturing operations.

Polysaccharide polymers have been used in the past to form the aqueous gels that were used as treatment fluids. The polysaccharide polymers were typically crosslinked in order for the treatment fluid to have the necessary viscosity to perform its intended task, such as transporting proppant in fracturing jobs. Once the treatment process was complete, the treatment fluid often required a significant amount of time and additional well treatment additives to remove the polymer gel, such as bactericides, antifoam agents, surfactants to aid dispersion, pH control agents, chemical breakers, enzymatic breakers, iron control agents, fluid stabilizers, antioxidants, salts, and the like. These additives must be formulated correctly, transported to the jobsite, and then pumped and metered accurately during the execution of the treatment. Complete removal of the polymer was difficult, often times resulting in residual polymer being left in the formation that clogged the pores of the formation, which prevented hydrocarbons from flowing through and from the formation.

The use of non-polymeric treatment fluids has increased in recent times because of the desirable properties of such non-polymeric treatment fluids. Such properties include the ability to transport proppant at lower viscosities than the polymer-based treatment fluids, the reduction of friction between the treatment fluid and the surfaces contacted therewith, and the quick reduction in viscosity upon contact with hydrocarbons. The non-polymeric treatment fluids contain viscoelastic surfactant gels that do not contain polymers. Because the treatment fluids do not contain polymers, they do not have a polymeric backbone structure to help obstruct the fluid from passing through the pore throats of the formation. While the benefits of using the viscoelastic treatment fluids are apparent, the lack of polymeric structure in these viscoelastic treatment fluids unfortunately can result in a high amount of fluid loss in treatment operations.

A need exists for methods and compositions that can be used in treatment operations that would benefit from the use of viscoelastic treatment fluids, but without the substantial amount of fluid loss that is typically encountered in such systems. It would be advantageous if such methods and compositions did not adversely affect the rheology of the viscoelastic treatment fluids.

SUMMARY OF THE INVENTION

In view of the foregoing, methods and compositions useful for treating a well bore are provided as embodiments of the present invention. In an embodiment, a method of treating a well bore is provided. In this embodiment, a viscoelastic treatment fluid comprising a fluid loss additive comprising a copolymer having a hydrophilic monomeric unit and a first anchoring monomeric unit is provided and introduced into a well bore that penetrates a subterranean formation. In an aspect, the first anchoring monomeric unit is based upon at least one of N-vinylformamide, N,N-diallylacetamide, or a mixture thereof.

In another embodiment, a method of treating a well bore is provided. In this embodiment, a viscoelastic treatment fluid that is essentially free of polymer is combined with a fluid loss additive comprising a copolymer having a hydrophilic monomeric unit and a first anchoring monomeric unit is provided and introduced into a well bore that penetrates a subterranean formation. In an aspect, the first anchoring monomeric unit is based upon at least one of N-vinylformamide, N,N-diallylacetamide, or a mixture thereof.

Besides the method embodiments, compositions are also provided as embodiments of the present invention. In an embodiment, a viscoelastic treatment fluid comprising a viscoelastic anionic surfactant and a fluid loss additive comprising a copolymer having a hydrophilic monomeric unit and a first anchoring monomeric unit is provided. In an aspect, the first anchoring monomeric unit is based upon at least one of N-vinylformamide, N,N-diallylacetamide, or a mixture thereof.

In an aspect, the treatment fluid is a viscoelastic treatment fluid that is essentially free of polymers. The methods and compositions of the present invention can be used in various treatment operations, such as fracturing, acidizing, gravel packing, drilling, plugging, and fluid loss control operations.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the operation and in the treatment of oilfield applications. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

Methods and compositions useful for treating a well bore are provided as embodiments of the present invention. In an embodiment, a method of treating a well bore is provided. In this embodiment, a viscoelastic treatment fluid comprising a fluid loss additive comprising a copolymer having a hydrophilic monomeric unit and a first anchoring monomeric unit is provided and introduced into a well bore that penetrates a subterranean formation. The fluid loss additive helps prevent the loss of treatment fluid typically experienced by viscoelastic treatment fluids.

In another embodiment, a method of treating a well bore is provided. In this embodiment, a viscoelastic treatment fluid that is essentially free of polymer is combined with a fluid loss additive comprising a copolymer having a hydrophilic monomeric unit and a first anchoring monomeric unit and introduced into a well bore that penetrates a subterranean formation.

Besides the method embodiments, compositions are also provided as embodiments of the present invention. In an embodiment, a viscoelastic treatment fluid comprising a viscoelastic anionic surfactant and a fluid loss additive comprising a copolymer having a hydrophilic monomeric unit and a first anchoring monomeric unit is provided.

Viscoelastic surfactant gels can experience high fluid loss when used as fracturing fluids, acidizing fluids, cleanout fluids, drilling fluids, or the like. The lack of polymer in the viscoelastic surfactant gels inhibits the viscoelastic surfactant from having sufficient structures to obstruct fluid from passing through the pore throats of the formation, other than the apparent viscosity of the system. When the fluid loss additive of the present invention is combined with viscoelastic fracturing fluids, the rate of fluid loss of the viscoelastic surfactant gels is substantially reduced.

In an aspect, the fluid loss additive of the present invention can include a terpolymer. Various types of terpolymers can be used in the present invention. The terpolymer can be derived from polyacrylamide. In an aspect, the polymer can be a terpolymer synthesized from an anionic monomer, a cationic monomer, and a neutral monomer. The monomers used preferably have similar reactivities so that the resultant amphoteric polymeric material has a random distribution of monomers. The anionic monomer can generally be any anionic monomer. Presently preferred anionic monomers include acrylic acid, methacrylic acid, 2-acrylamide-2-methylpropane sulfonic acid, and maleic anhydride. The cationic monomer can generally be any cationic monomer. Suitable cationic monomers can include dimethyl-diallyl ammonium chloride, dimethylamino-ethyl methacrylate, and allyltrimethyl ammonium chloride. The neutral monomer can generally be any neutral monomer. Suitable neutral monomers include butadiene, N-vinyl-2-pyrrolidone, methyl vinyl ether, methyl acrylate, maleic anhydride, styrene, vinyl acetate, acrylamide, methyl methacrylate, and acrylonitrile. The polymer can be a terpolymer synthesized from acrylic acid (AA), dimethyl diallyl ammonium chloride (DMDAC), and acrylamide (AM). The ratio of monomers in the terpolymer can generally be any ratio. A presently preferred ratio is about 1:1:1. Other suitable types of terpolymers useful in the fluid loss additive of the present invention will be apparent to those of skill in the art and are to be considered within the scope of the present invention.

In an aspect, the fluid loss additive can include a copolymer and an aqueous base fluid, wherein the copolymer can include a hydrophilic monomeric unit and a first anchoring monomeric unit and wherein the first anchoring monomeric unit can be based on at least one of N-vinylformamide, N-methylacetamide, N,Ndiallylacetamide, or a mixture thereof. In one particular embodiment, the first anchoring monomeric unit can be based on N-vinylformamide. The copolymer further can also include a second anchoring monomeric unit based on at least one of dimethyldiallyl ammonium chloride, acrylic acid (such as ammonium or alkali metal salts of acrylic acid), or a mixture thereof. The copolymer further can also include a filler monomeric unit based on acrylamide, methylacrylamide, or a mixture thereof. The hydrophilic monomeric unit can be based on at least one of acrylamidomethylpropanesulfonic acid, acrylic acid, acrylate salt, or a mixture thereof. The hydrophilic monomeric unit can be based on ammonium or alkali metal salts of acrylamidomethylpropanesulfonic acid, and the first anchoring monomeric unit can be based on N-vinylformamide, and the second anchoring monomeric unit can be based on ammonium or alkali metal salts of acrylic acid. The hydrophilic monomeric unit can be based on ammonium or alkali metal salts of acrylamidomethylpropanesulfonic acid, the first anchoring monomeric unit can be based on N-vinylformamide, and the filler monomeric unit can be based on acrylamide. The first anchoring monomeric unit can be N-vinylformamide present in an amount of from about 2% to about 30% by weight of the polymer molecule, and the hydrophilic monomeric unit can be ammonium or alkali metal salt of acrylamidomethylpropane sulfonic acid. The first anchoring monomeric unit can be N-vinylformamide present in an amount of from about 5% to about 15% by weight of the polymer molecule, and the hydrophilic monomeric unit can be acrylamidomethylpropane sulfonic acid. In one embodiment, the copolymer can have a molecular weight of from about 100,000 to about 20 MM. In another embodiment, the copolymer can have a molecular weight of greater than about 100,000.

In an aspect, the methods described herein can further include preparing an aqueous solution of a hydrophilic monomer and first anchoring monomer; and polymerizing the monomers in the solution to form the copolymer; wherein the hydrophilic monomer is at least one of acrylamidomethylpropanesulfonic acid (such as ammonium or alkali metal salt of AMPS), acrylic acid, acrylate salt, or a mixture thereof; and wherein the first anchoring monomer is at least one of N-vinylformamide, N-methylacetamide, N,N-diallylacetamide, or a mixture thereof. In another embodiment, the method can further include preparing an aqueous solution of a hydrophilic monomer, first anchoring monomer, and second anchoring monomer; and polymerizing the monomers in the solution to form the copolymer; wherein the hydrophilic monomer is at least one of ammonium or alkali metal salt of acrylamidomethylpropane-sulfonic acid, acrylic acid, acrylate salt, or a mixture thereof; wherein the first anchoring monomer is at least one of N-vinylformamide, N-methylacetamide, N,N-diallylacetamide, or a mixture thereof; and wherein the second anchoring monomer is at least one of dimethyldiallyl ammonium chloride, ammonium or alkali metal salts of acrylic acid, or a mixture thereof. In another embodiment, the method can further include preparing an aqueous solution of a hydrophilic monomer, first anchoring monomer, and filler monomer; and polymerizing the monomers in the solution to form the copolymer; wherein the hydrophilic monomer is at least one of ammonium or alkali metal salt of acrylamidomethylpropanesulfonic acid, acrylic acid, acrylate salt, or a mixture thereof; wherein the first anchoring monomer is at least one of N-vinylformamide, N-methylacetamide, N,N-diallylacetamide, or a mixture thereof; and wherein the filler monomer is at least one of acrylamide, methacrylamide, or a mixture thereof.

In the practice embodiments of the present invention, the fluid loss additive can further include a mutual solvent. The copolymer can be present in the fluid loss additive in a concentration of from about 500 ppm to about 10,000 ppm. In one embodiment, the copolymer can have a molecular weight of from about 100,000 to 20 MM. Alternatively, the copolymer can have a molecular weight of greater than about 100,000.

In an aspect, hydrophilic monomers can include both ionic and nonionic monomers. The term "nonionic monomer" refers to monomers that do not ionize in aqueous solution at neutral pH. Examples of suitable nonionic hydrophilic monomers include, but are not limited to, acrylamide, N-vinyl pyrrolidone and N-vinylacetamide. Ionic monomers can be either anionic or cationic. Examples of anionic monomers include, but are not limited to, alkaline salts of acrylic acid, ammonium or alkali salts of acrylamidomethylpropane sulfonic acid ("AMPS"), maleic acid, itaconic acid, styrene sulfonic acid, and vinyl sulfonic acid (or its ammonium or alkali metal salts). Examples of suitable cationic monomers include, but are not limited to, dimethyldiallyl ammonium chloride and quaternary ammonium salt derivatives from acrylamide or acrylic acid such as acrylamidoethyltrimethyl ammonium chloride. Further information on monomers and polymer compositions, as well as on well treatment methods employing polymer compositions can be found in U.S. Pat. No. 5,465,792 to Dawson; U.S. Pat. No. 5,735,349 to Dawson; and U.S. Pat. No. 6,169,058 to Le, et al., each of which are incorporated herein by reference in their entirety. In one embodiment, one or more hydrophilic monomeric units are typically employed and are based on AMPS (such as at least one of ammonium or alkali metal salt of AMPS, including sodium and/or potassium salts of AMPS), acrylic acid, an acrylic salt (such as sodium acrylate, N-vinyl pyrrolidone, ammonium or alkali metal salts of styrene sulfonic acid, etc.), or a mixture thereof. It can be desirable to employ ammonium or alkali metal salts of AMPS for added stability, with or without one or more other hydrophilic monomers, in those cases where aqueous treatment and/or formation fluids contain high concentrations of divalent ions, such as $Ca^{+2}$, $Mg^{+2}$, etc.

Optional second anchoring monomeric units can include any monomeric unit that will adsorb onto formation material. In one embodiment, examples of optional second anchoring monomeric units include at least one of dimethyldiallylammonium chloride, ammonium or alkali metal salts of acrylic acid, (such as sodium salts), or a mixture thereof. Optional filler monomeric units can include any monomeric unit suitable for copolymerization with the other monomers in the composition. Desirable characteristics of filler monomer units are the ability to retain water solubility and/or relative low cost compared to other monomer units present in a copolymer. Filler monomer units can be based on, for example, monomers such as acrylamide, methylacrylamide, etc. In one embodiment, optional filler monomeric units include monomers such as acrylamide, methylacrylamide, etc. With benefit of the present disclosure, the disclosed compositions can be prepared using any method suitable for preparing co-polymers known to those of skill in the art. In one embodiment, monomers corresponding to the desired monomeric units in the copolymer are selected and polymerized in an aqueous monomer solution. In one embodiment, a first N-vinylformamide monomer is combined with a hydrophillic monomer (such as ammonium or alkali metal salt/s of AMPS) and a filler monomer (such as acrylamides), in an aqueous base fluid, typically water. Other additives can include disodium ethylenediamine tetraacetate ($Na_2EDTA$), pH adjusting chemicals (such as potassium or sodium hydroxide), and a catalyst to initiate polymerization. Monomers with other anchoring groups can also be present.

Any relative proportion of the disclosed monomers that is suitable for polymerization and use in the fluid loss additive can be combined in an aqueous solution for polymerization. However, in one embodiment, a first anchoring monomer is combined to be present in an amount of from about 2% to about 30% by weight of the total polymer composition, alternatively from about 5% to about 15% by weight of the total polymer composition. In another embodiment a first anchoring monomer is combined to be present in an amount from about 2% to about 30%, alternatively from about 5% to about 15%, by weight of the total polymer composition; ammonium or alkali metal salts of AMPS is combined so that AMPS-based monomer is present in an amount from about 0% to about 50%, alternatively from about 20% to about 30%, by weight of the total polymer composition; and acrylamide is combined to be present in an amount from about 20% to about 98%, alternatively from about 40% to about 65% by weight of the total polymer composition. In one embodiment, N-vinylformamide is utilized as the first anchoring monomer.

In an aspect, the fluid loss additive can include co-polymers having at least one of N-vinylformamide, N-methylacetamide, and/or N,N-diallylacetamide anchoring groups in combination with at least one hydrophillic monomer, such as a monomer based on AMPS. Other optional anchoring groups, such as sodium acrylate, can also be present in the co-polymers. Optional filler monomeric units can also be present in the fluid loss additive.

The viscoelastic treatment fluid of the present invention can be used in a variety of applications. For example, the viscoelastic treatment fluid that is introduced into the well bore can be a part of a fracturing, acidizing, gravel packing, drilling, plugging, or fluid loss control operation. Other suitable applications in which the methods and compositions of the present invention can be used will be apparent to those of skill in the art and are to be considered within the scope of the present invention.

Various types of viscoelastic treatment fluids can be used in embodiments of the present invention. In an aspect, the treatment fluid is a viscoelastic treatment fluid that is essentially free of polymers. As an example of a suitable type of treatment fluid, the viscoelastic treatment fluid can include an aqueous base, a surfactant comprising an alkyl sarcosinate having from 12 to 24 carbon atoms and a buffer for adjusting the pH of the combined aqueous base and surfactant at or for the formation pH. The alkyl sarcosinate can be present in the range from about 0.5 to 10% by weight based upon the weight of the total fluid. The pH of the viscous fluid can be adjusted with the buffer to be in the range from about 6.5 to 10.0 for most formations.

As another example of a suitable viscoelastic treatment fluid that can be used in embodiments of the present invention, an anionic surfactant, such as sodium xylene sulfonate can be combined with a cationic surfactant, such as N,N,N, trimethyl-1-octadecammonium chloride, in water, in ratios of from about 1:4 to about 4:1 by volume, to obtain a clear viscoelastic gel capable of proppant transport. The viscoelastic treatment fluid of the present invention can be batch-mixed or mixed on-the-fly with good results. The surface tension of the viscoelastic treatment fluid of the present invention can be in the area of about 30 dynes/cm$^2$, which aids in rapid flowback for cleaning up the well after treatment, such as fracturing.

In an aspect, the viscoelastic treatment fluid can include a viscoelastic fracturing foam capable of achieving high viscosity at a wide range of temperatures. An anionic surfactant, such as sodium xylene sulfonate is combined with a cationic surfactant, such as N,N,N, trimethyl-1-octadecamonium chloride, in water, in ratios of from about 1:4 to about 4:1 by volume, to obtain a clear viscoelastic gel capable of proppant transport. Other anionic and/or cationic surfactants may be used as will be obvious to one skilled in the art. The gel can be batch-mixed or mixed on-the-fly. The gel exhibits a fairly low surface tension, in the area of about 30 dynes/cm$^2$, which aids in rapid flow-back for cleaning up the well after fracturing. The gel is then mixed with from 53% to 96% or more $CO_2$ to form a foam.

The gel exhibits good foaming characteristics at low loadings of about 3 L/m$^3$ of each of the anionic and cationic surfactants.

As further examples, suitable types of viscoelastic treatment fluids that can be used in embodiments of the present invention are described in U.S. Pat. Nos. 6,491,099; 6,468, 945; 6,401,489, and 7,303,018, all of which are incorporated by reference in their entireties. Viscoelastic treatment fluids that can be used in embodiments of the present invention include ElastaFrac™, AquaStar™, AquaClear$^{SM}$, VisClear$^{SM}$, and Divert™ S, all of which are commercially available from BJ Services Company Baker Hughes Incorporated in Houston, Tex. ElastaFrac™ and AquaClear™ are fracturing fluids. VisClear$^{SM}$ and Divert™ S are fluids used in acidizing applications. Other suitable viscoelastic treatment fluids will be apparent to those of skill in the art and are to be considered within the scope of the present invention.

The amount of the fluid loss additive that is added to the viscoelastic treatment fluid can vary in embodiments in the present invention. In an aspect, the fluid loss additive can be present in an amount that is effective at controlling fluid loss within the application in which is being used. In an aspect, the fluid loss additive can be present in a range of about 0.1 gpt to about 60 gpt; alternatively, from about 0.5 gpt to about 40 gpt; or alternatively, from about 1 gpt to about 10 gpt. Suitable amounts of the fluid loss additive will be apparent to those of skill in the art are to be considered within the scope of the present invention.

The compositions and methods of the present invention can be used in applications having a wide range of temperatures. For example, the fluid loss additive of the present invention can be used in applications in which the well bore has a temperature of up to about 300° F.; alternatively, up to about 225° F.; or alternatively, up to about 160° F.

The viscoelastic treatment fluid can be injected or pumped into the formation at pumping rates and treating pressures above the fracture gradient of the formation. The volume of treating solution used is based upon the desired fracture geometry, the thickness of the zone to be treated, the porosity of the formation being treated, and other factors, as will be apparent to those of skill in the art.

Besides the treatment fluids and fluid loss additives described herein, various additives can be useful in the present invention. Additives used in the oil and gas industry and known in the art, including but not limited to, corrosion inhibitors, non-emulsifiers, iron control agents, delay additives, silt suspenders, flowback additives, buffers, relative permeability modifiers, surfactants, proppants, and gel breakers, can also be used in embodiments of the present invention. Other suitable additives useful in the present invention will be apparent to those of skill in the art and are to be considered within the scope of the present invention.

EXAMPLES

The following examples are included to demonstrate the use of compositions in accordance with embodiments of the present invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

Example 1

Two samples were prepared using AquaStar™ fracturing fluid, which is described in U.S. Pat. No. 6,468,945 and contains a mixture of a cationic fracturing fluid FAC-1W and an anionic surfactant FAC-2. AquaCon™ additive, which is a moderate molecular weight hydrophilic terpolymer based on polyacrylamide capable of binding to formation surfaces to enhance hydrocarbon production, was used as the fluid loss additive in this example. AquaCon™ additive is described in U.S. Pat. No. 6,228,812, which is incorporated by reference in its entirety. AquaCon™ is commercially available from Baker Hughes Incorporated in Houston, Tex.

Figure 1:
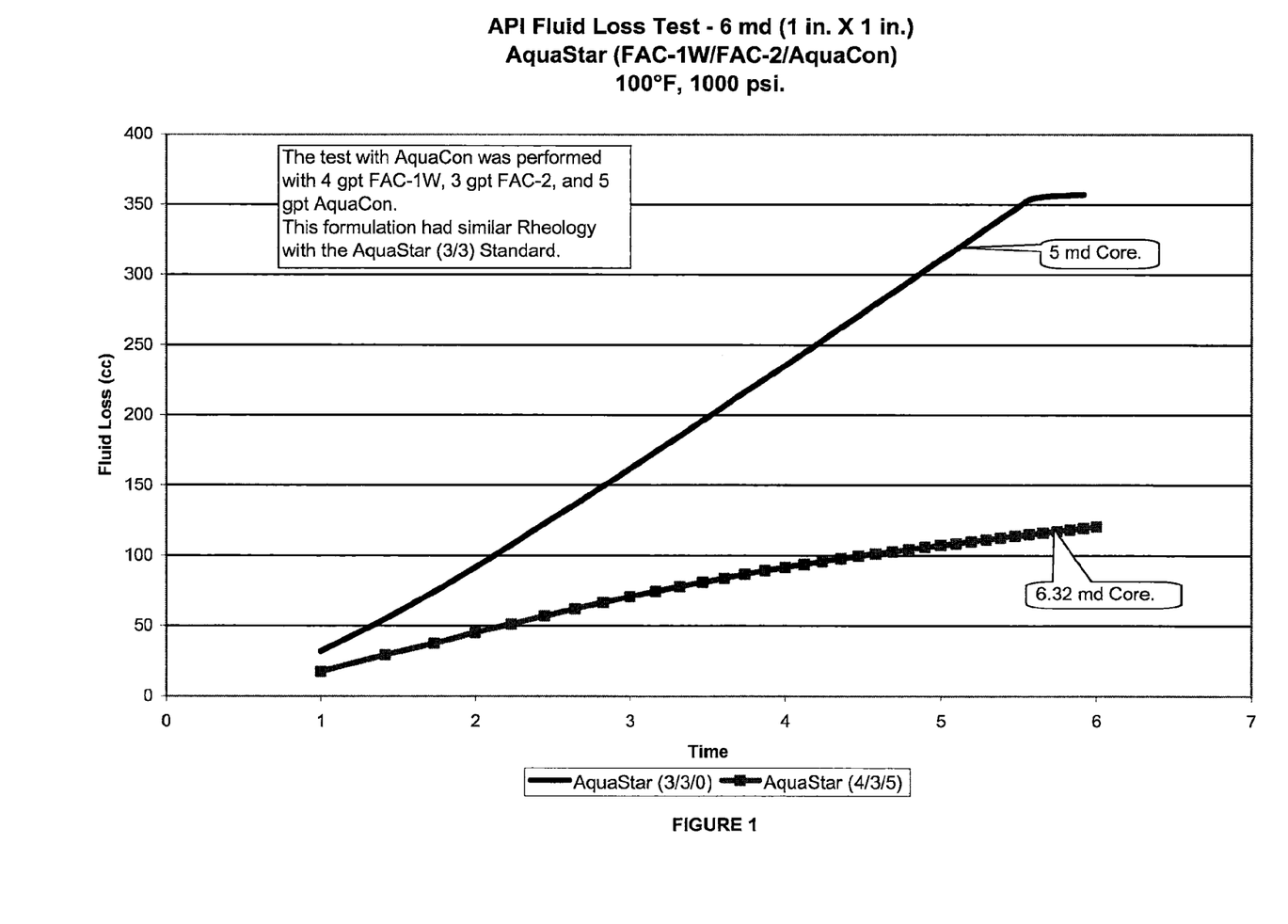
FIG. 1 is a graph showing the results of an API fluid loss test performed at 1000 psi and 100° F. showing the fluid loss in volume (cc) versus the square root of time of varying amounts of fracturing fluid and varying amounts of the fluid loss additive made in accordance with embodiments of the present invention.

In one sample, a fracturing fluid was prepared containing 3 gallons/1000 gallons cationic surfactant FAC-1W and 3 gallons/1000 gallons anionic surfactant FAC-2, but no fluid loss additive was used. An API fluid loss test according to ASTM D5891-02 was performed on the samples. As can be seen in FIG. 1, this sample has a permeability value of about 5 millidarcy (mD). Another sample was prepared using 4 gallons/ 1000 gallons cationic surfactant FAC-1W, 3 gallons/1000 gallons anionic surfactant FAC-2, and 5 gallons/1000 gallons fracturing fluid AquaCon™ additive. The permeability of the rock was higher in the sample with the fluid loss additive than in the sample without the fluid loss additive. The permeability value was measured at 6.32 mD.

Example 2

Figure 2:
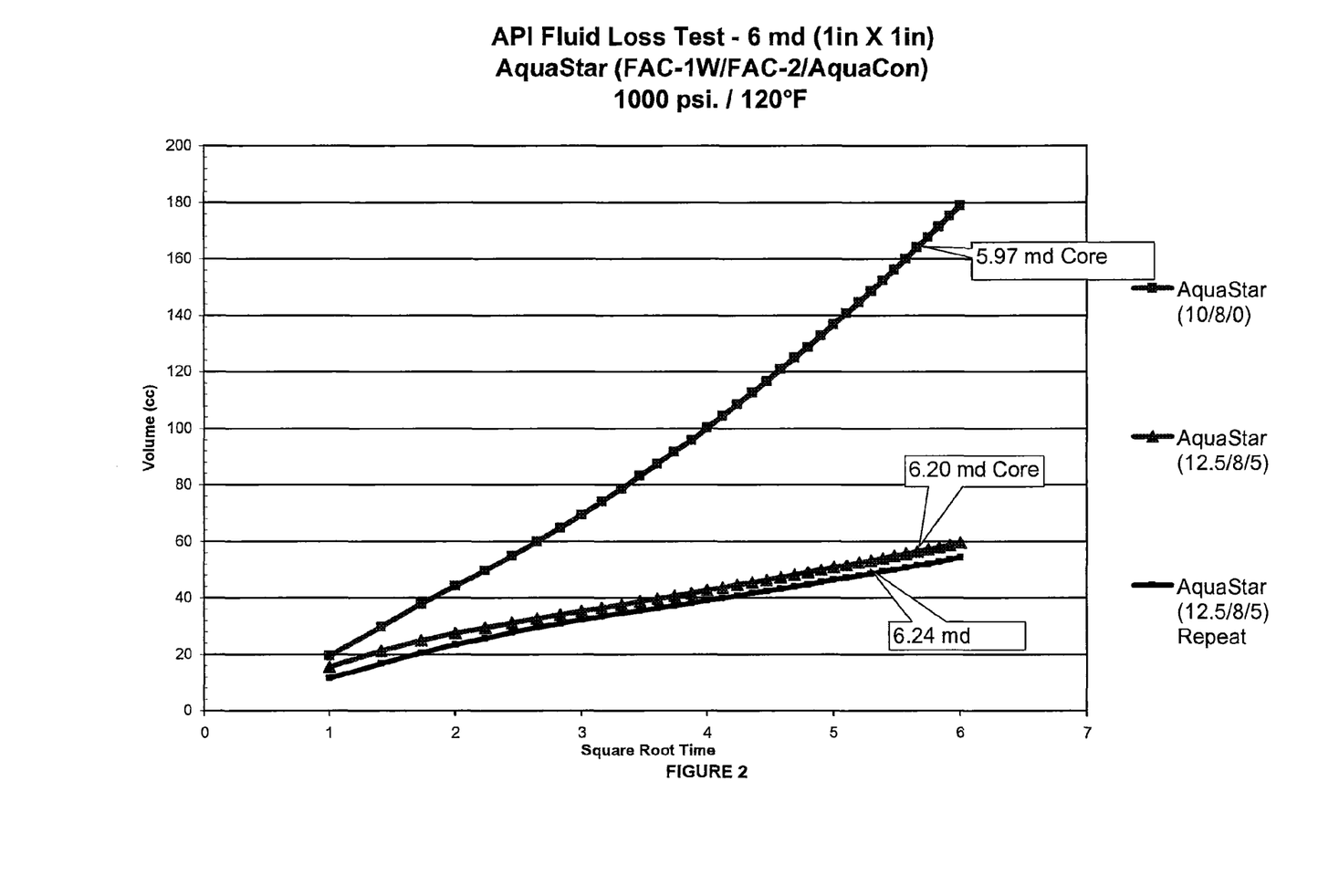
FIG. 2 is a graph showing the results of an API fluid loss test performed at 1000 psi and 120° F. showing the fluid loss in volume (cc) versus the square root of time of varying amounts of fracturing fluid and varying amounts of the fluid loss additive made in accordance with embodiments of the present invention.

Three samples were prepared using AquaStar™ fracturing fluid that contains a mixture of a cationic surfactant FAC-1W and an anionic surfactant FAC-2. AquaCon™ additive was used as the fluid loss additive in this example. In one sample, 10 gallons/1000 gallons of cationic surfactant FAC-1W was combined with 8 gallons/1000 gallons of anionic surfactant FAC-2, but no fluid loss additive was used. As can be seen in FIG. 2, this sample has a permeability value of about 5.97 millidarcy (mD). Two samples were prepared using 12.5 gallons/1000 gallons fracturing fluid of FAC-1W, 8 gallons/1000 gallons fracturing fluid of FAC-2, and 5 gallons/1000 gallons fracturing fluid of AquaCon™ additive. In each of these examples, the permeability of the rock was higher than in the sample without the fluid loss additive. The permeability values were measured at 6.20 mD and 6.24 mD respectively.

Example 3

Figure 3:
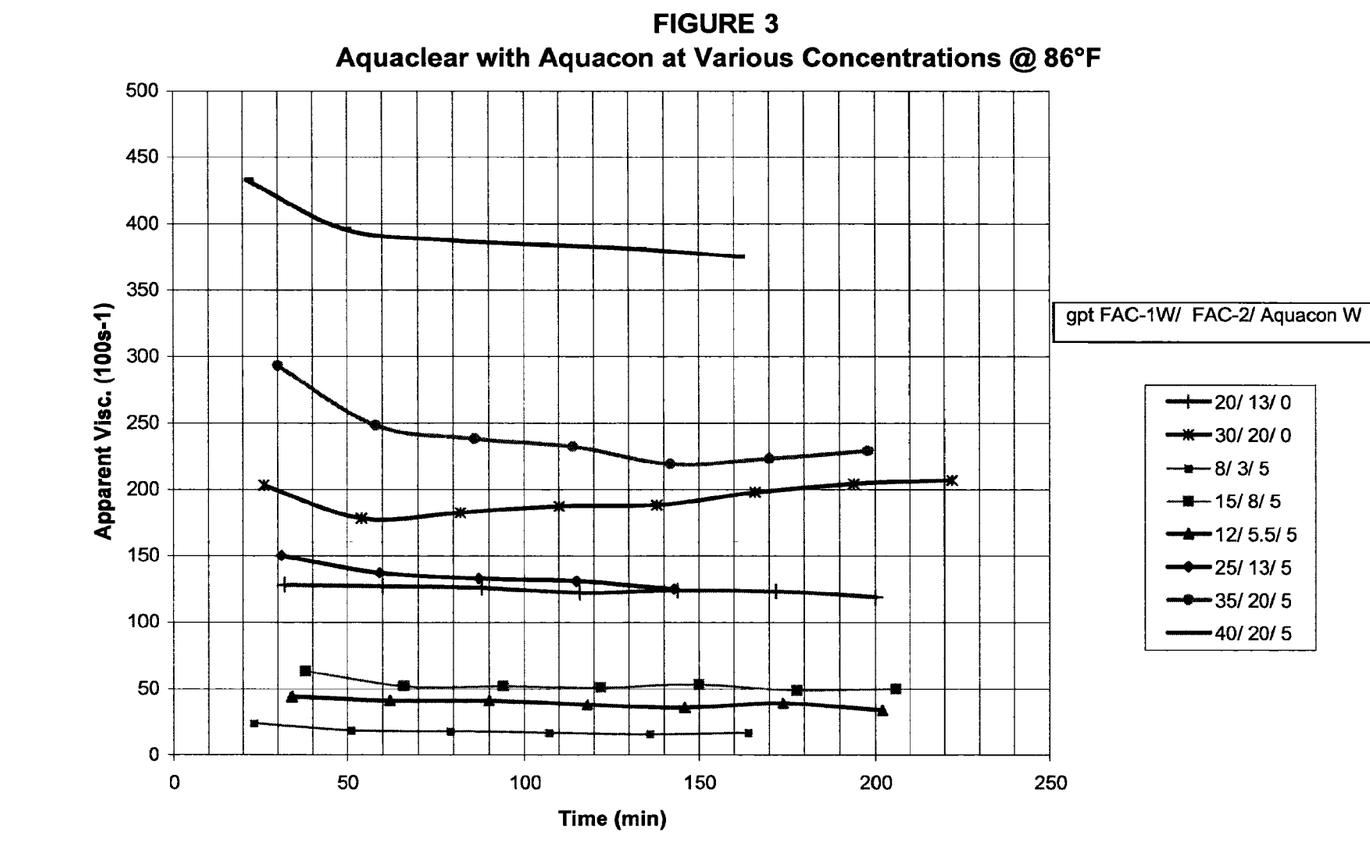
FIG. 3 is a graph showing the apparent viscosity of various samples at 86° F. versus time of samples having varying amounts of fracturing fluid and varying amounts of the fluid loss additive made in accordance with embodiments of the present invention.

In this example, the apparent viscosity (100 sec-1) was measured at various time intervals for several samples that were prepared using AquaClear™ fracturing fluid with AquaCon™ additive. AquaClear™ fluid is prepared by mixing a combination of FAC-1W and FAC-2. As shown in FIG. 3, the concentration of FAC-1W, FAC-2, and the fluid loss additive AquaCon™ were varied at 86° F. The purpose of this Example was to re-optimize the ratio of FAC-1W and FAC-2 to take into account the anionic charge density contributed to the fluid by the addition of the AquaCon™ additive to achieve the same viscosity of the fluid as without the addition of the AquaCon additive.

Example 4

Figure 4:
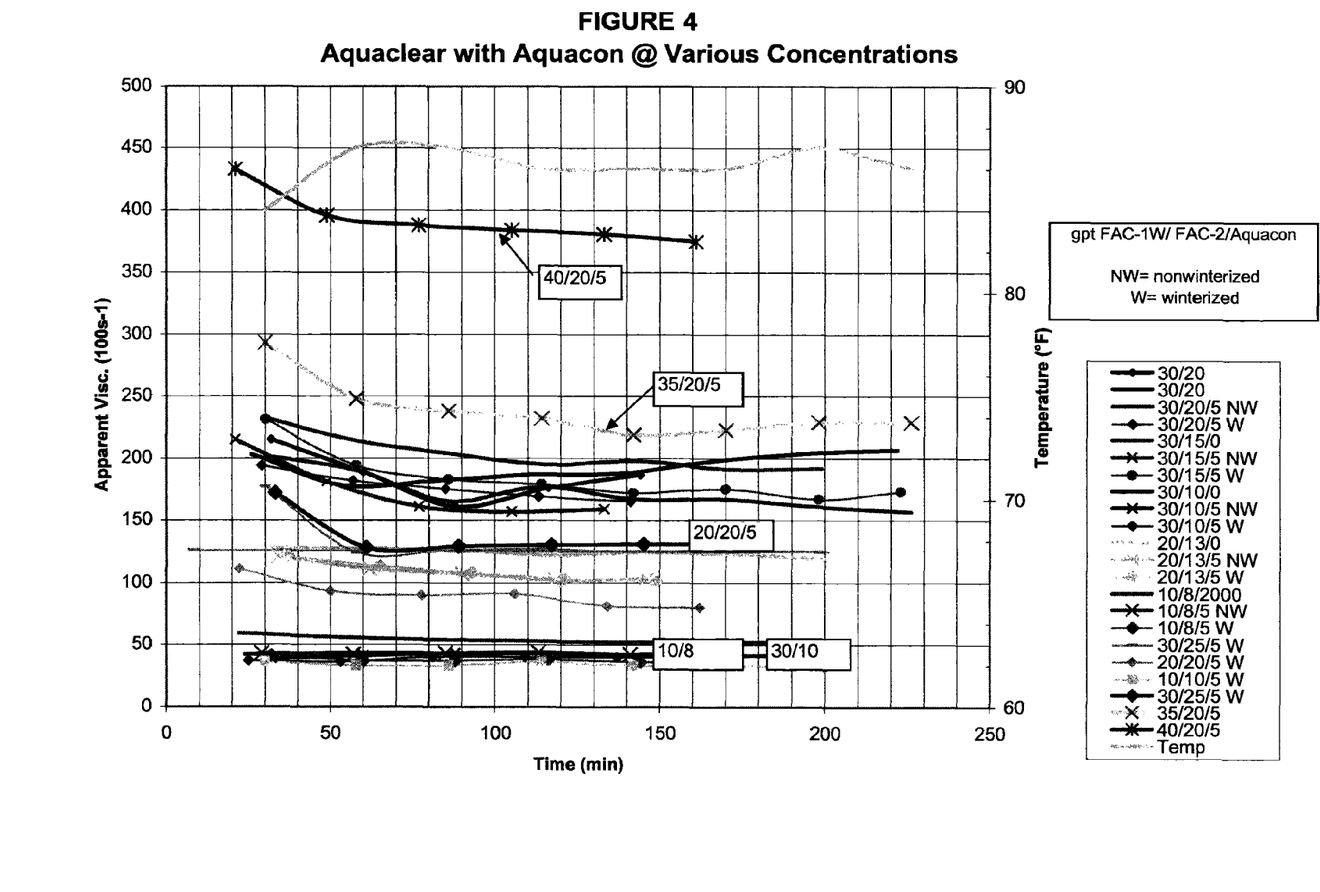
FIG. 4 is a graph showing the apparent viscosity of various samples at various temperatures versus time of samples having varying amounts of fracturing fluid and varying amounts of the fluid loss additive made in accordance with embodiments of the present invention.

In this example, the apparent viscosity (100 sec-1) was measured at various time intervals for several samples that were prepared using Aquaclear™ fracturing fluid with AquaCon™ additive. AquaClear™ fluid is prepared by mixing a combination of FAC-1W and FAC-2. As shown in FIG. 4, the concentration of FAC-1W, FAC-2, and the fluid loss additive AquaCon™ were varied at various temperatures, with some of the samples being winterized and others being nonwinterized.

Example 5

Figure 5:
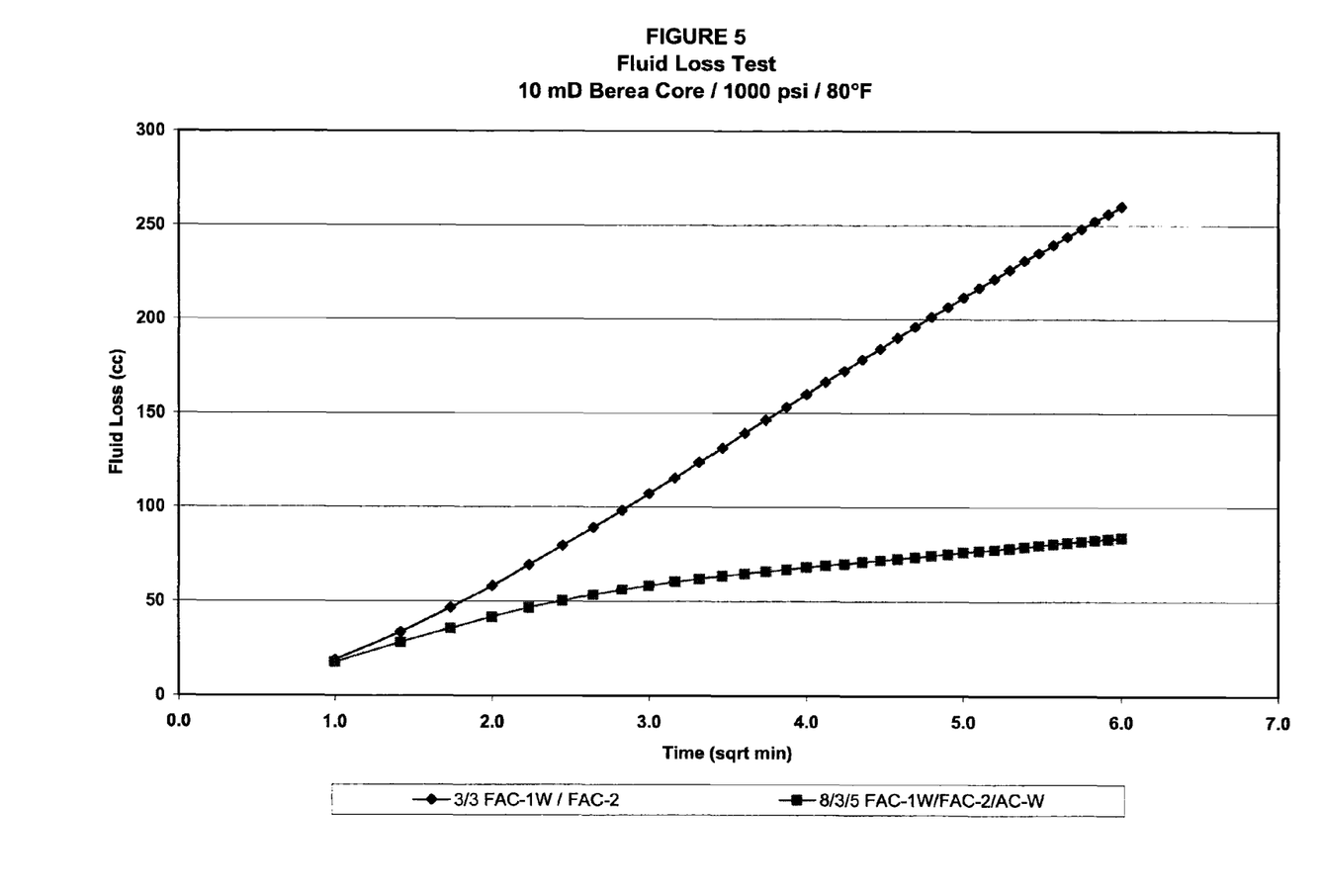
FIG. 5 is a graph showing the results of an API fluid loss test performed at 1000 psi and 80° F. showing the fluid loss in volume (cc) versus the square root of time of varying amounts of fracturing fluid and varying amounts of the fluid loss additive made in accordance with embodiments of the present invention.

Two samples were prepared using a mixture of a cationic fracturing fluid FAC-1W and an anionic surfactant FAC-2. AquaCon™ additive was used as the fluid loss additive in this example. In one sample, 3 gallons/1000 gallons fracturing fluid FAC-1W was combined with 3 gallons/1000 gallons fracturing fluid, but no fluid loss additive was used. The other sample contained 8 gallons/1000 gallons fracturing fluid FAC-1W, 3 gallons/1000 gallons fracturing fluid FAC-2, and 5 gallons/1000 gallons fracturing fluid AquaCon™ additive. As can be seen in FIG. 5, this sample was performed using a 10 mD Berea Core at 1000 psi at 80° F. The fluid loss of the sample that contained the fluid loss additive was substantially less than the sample without any fluid loss additive.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of fracturing a subterranean formation penetrated by a well bore comprising the steps of:
   a. combining (i) a viscoelastic surfactant gel essentially free of a polymer and (ii) a fluid loss additive comprising a copolymer comprising a hydrophilic monomeric unit and a first anchoring monomeric unit based upon at least one of N-vinylformamide, N,N-diallylacetamide, or a mixture thereof to render a fracturing fluid;
   b. pumping the fracturing fluid into the well bore at a pressure above the fracture gradient of the subterranean formation;
   c. fracturing the subterranean formation and inhibiting the passage of the viscoelastic surfactant gel in the fracturing fluid from passing through pore throats of the subterranean formation, thereby reducing the rate of fluid loss of the viscoelastic surfactant gel into the subterranean formation.

2. The method of claim 1, wherein the copolymer further comprises a second anchoring monomeric unit based on at least one of dimethyldiallyl ammonium chloride, ammonium or alkali metal salts of acrylic acid, or a mixture thereof.

3. The method of claim 1, wherein the copolymer further comprises a filler monomeric unit based on acrylamide, methylacrylamide, or a mixture thereof.

4. The method of claim 1, wherein the hydrophilic monomeric unit is based on an ammonium or alkali metal salt of acrylamidomethylpropanesulfonic acid, acrylamidomethylpropanesulfonic acid, acrylic acid, acrylate salt, or a mixture thereof.

5. The method of claim 1, wherein the fluid loss additive is a present in a range of about 0.1 gpt to about 60 gpt.

6. The method of claim 1, wherein the fracturing fluid is introduced into the well bore at a temperature of up to about 300° F.

7. The method of claim 1, wherein the viscoelastic surfactant gel fluid further comprises an anionic surfactant.

8. The method of claim 1, wherein the amount of first anchoring monomeric unit in the copolymer is between from about 2 to about 30% by weight.

9. The method of claim 1, wherein:
   (i) the amount of fluid loss additive in the fracturing fluid is the range of about 0.1 gpt to about 60 gpt; and
   (ii) the pH of the fracturing fluid is buffered in the range from about 6.5 to 10.0.

10. A method of reducing fluid loss of a viscoelastic surfactant gel into a subterranean formation which comprises pumping into a well bore penetrating a subterranean formation at a pressure above the fracture gradient of the subterranean formation a fracturing fluid prepared by combining:
   (i) a viscoelastic surfactant gel essentially free of a polymer; and
   (ii) a fluid loss additive comprising a copolymer comprising a hydrophilic monomeric unit and a first anchoring monomeric unit based upon at least one of N-vinylformamide, N,N-diallylacetamide, or a mixture thereof
and fracturing the subterranean formation, wherein the amount of fluid loss of the viscoelastic surfactant gel in the fracturing fluid into the subterranean formation is reduced by the presence of the fluid loss additive in the fracturing fluid.

11. The method of claim 10, wherein the amount of fluid loss additive in the fracturing fluid is in the range of about 0.1 gpt to about 60 gpt.

12. The method of claim 10, wherein the fracturing fluid is introduced into the well bore at a temperature of up to about 300° F.

13. The method of claim 10, wherein the viscoelastic surfactant gel comprises an anionic surfactant.

14. The method of claim 10, wherein the copolymer further comprises a second anchoring monomeric unit based on at least one of dimethyldiallyl ammonium chloride, ammonium or alkali metal salts of acrylic acid, or a mixture thereof.

15. The method of claim 10, wherein the copolymer further comprises a filler monomeric unit based on acrylamide, methylacrylamide, or a mixture thereof.

16. The method of claim 10, wherein the hydrophilic monomeric unit is based on an ammonium or alkali metal salt of acrylamidomethylpropanesulfonic acid, acrylamidomethylpropanesulfonic acid, acrylic acid, acrylate salt, or a mixture thereof.

17. A method of fracturing a subterranean formation penetrated by a well bore which comprises:
   pumping into the subterranean formation at a pressure above the pressure gradient of the subterranean formation a fracturing fluid prepared by combining:
   (i) a viscoelastic surfactant gel essentially free of a polymer; and
   (ii) a fluid loss additive comprising a copolymer comprising a hydrophilic monomeric unit and a first anchoring monomeric unit based upon at least one of N-vinylformamide, N,N-diallylacetamide, or a mixture thereof; and
   reducing the rate of fluid loss of the viscoelastic surfactant gel in the fracturing fluid into the subterranean formation by the presence of the fluid loss additive in the fracturing fluid.

18. The method of claim 17, wherein the viscoelastic surfactant of the viscoelastic surfactant gel is an alkyl sarcosinate or the combination of a cationic surfactant and an anionic surfactant.

19. The method of claim 17, wherein the viscoelastic surfactant of the viscoelastic surfactant gel is N,N,N,trimethyl-1-octadecammonium chloride and sodium xylene sulfonate.

20. The method of claim 17, wherein the copolymer further comprises a second anchoring monomeric unit based on at least one of dimethyldiallyl ammonium chloride, ammonium or alkali metal salts of acrylic acid, or a mixture thereof.

* * * * *